United States Patent [19]

Kegelman

[11] 3,847,674

[45] Nov. 12, 1974

[54] VOLTAIC CELL WITH FUSED COPPER SULFIDE CATHODE

[75] Inventor: Matthew Roland Kegelman, Wilmington, Del.

[73] Assignee: E. I. du Pont de Nemours and Company, Wilmington, Del.

[22] Filed: May 10, 1973

[21] Appl. No.: 358,859

Related U.S. Application Data

[63] Continuation of Ser. No. 229,569, Feb. 25, 1972, , which is a continuation-in-part of Ser. No. 26,762, April 8, 1970.

[52] U.S. Cl. .................................. 136/100, 136/23
[51] Int. Cl. ........................................... H01m 17/02
[58] Field of Search....... 136/23, 100, 120, 115–117

[56] References Cited
UNITED STATES PATENTS 3,655,446   4/1972   Gerbier et al.......................... 136/23
3,674,560   7/1972   Alder................................... 136/23

Primary Examiner—Winston A. Douglas
Assistant Examiner—C. F. LeFevour

[57] ABSTRACT

Voltaic cell performance is improved with the use of structurally integral porous cathodes of fused cupric sulfide having a porosity of at least 40% and resistivity of less than 0.5 Ohm-cm. The cathodes are formed from a homogeneous mixture of copper and sulfur powder by compacting the powder mixture into a coherent body with mechanical pressure at a temperature below the melting point of sulfur, and then heating the coherent body at about atmospheric pressure to effect reaction of the finely divided copper and sulfur to form the fused cupric sulfide cathode structure.

3 Claims, No Drawings

VOLTAIC CELL WITH FUSED COPPER SULFIDE CATHODE

CROSS-REFERENCE TO RELATED APPLICATIONS

This is a continuation of application Ser. No. 229,569, filed Feb. 25, 1972, which is a continuation-in-part of application Ser. No. 26,762 filed Apr. 8, 1970.

BACKGROUND OF THE INVENTION

High energy density voltaic cells are extremely desirable for use in applications where minimum cell weight is desired, such as in rocketry application. To achieve high energy density cells, the thrust of most experimental work has been to develop non-aqueous cells with active metal anodes. In producing such cells, it is desirable that electrodes have high conductivity, be highly porous, i.e., have high surface area and have high electrochemical utilization of the cathode. Metallic anodes used in most cells have minimal resistance and non-aqueous electrolytes having low resistance are available in the art. However, the cathode structure has continued to be a major source of cell resistance due to poor cathode conductivity and polarization caused by hindered mass transport inside the cathode.

Methlie, in U.S. Pat. No. 3,415,687 discloses the performance of a lithium anode cell having a cathode comprising a paste of cupric sulfide and graphite powders in methyl acetate. Paste cupric sulfide cathodes of the art, while operable and even practical in certain non-aqueous cell applications, are frequently unsatisfactory because they contain electrochemically inert, conductive material such as carbon powder to provide practical, low resistivity in the paste. Moreover, paste cathodes inherently lack sufficient structural integrity to assure maximum electrical contact between the cupric sulfide particles and the conductive powder particles and between the particles and the current collector, reducing the amount of cupric sulfide available for electrochemical utilization. Compact copper sulfide cathodes prepared by pressure compacting copper sulfide powder tend to be relatively non-porous and have high resistivity and, therefore, restrict electrochemical reactivity due to hindered mass transport inside the cathode. The power drain rate of a cell is therefore unnecessarily limited by such low-porosity cathodes. Such compact copper sulfide cathodes can also restrict the power drain rate of cells since they can have relatively high resistivity. While pressure compacted cupric sulfide cathodes having low resistivity are disclosed in French Pat. No. 1,490,725, the disclosed cathodes are nevertheless deficient in porosity and the process for preparing such cathodes is excessively time consuming, requiring a long period of pressurization followed by a long curing period.

SUMMARY OF THE INVENTION

In summary, this invention is directed to an improved voltaic cell comprising an active metal anode, an electrolyte non-reactive with other cell components and having a conductivity of at least $10^{-3}$ ohm$^{-1}$ cm$^{-1}$ and a cathode of cupric sulfide, the improvement comprising a cathode structure consisting essentially of fused copper sulfide and having a porosity of at least 40% and a resistivity of less than 0.5 Ohm-cm. Such cathodes offer high copper sulfide electrochemical utilization and are prepared by a process of mixing finely divided sulfur powder and copper powder and compacting the mixture into a coherent body in a mold and at a temperature below the melting point of sulfur and then heating the coherent body at atmospheric pressure to effect reaction of the copper and sulfur powders to form fused, strong and porous cupric sulfide.

DESCRIPTION OF THE INVENTION

The present invention relates to voltaic cells containing cathodes which consist essentially of copper sulfide including cupric sulfide (CuS), the digenite ($Cu_9S_5$) form of copper sulfide and cuprous sulfide ($Cu_2S$) and which have a structurally integral, fused, porous, open-cell structure, a porosity of 40% to about 80%, a resistivity of less than 0.5 Ohm-cm. and high electrochemical utilization of copper sulfide. The advantages of such cathodes in voltaic cells include minimum loss of electrochemically utilizable copper sulfide during cell storage and handling, maximized utilization of copper sulfide during cell discharge, and maximized electrolyte surface contacts as measured by porosity. An added advantage is the simplicity and ease with which the cathodes are prepared.

Although the voltaic cells of this invention can be aqueous electrolyte cells, those most preferred are high energy density, non-aqueous cells utilizing, as an anode, one of the light metals of Groups IA and IIA of the Periodic Table.

The cathode active materials are cupric sulfide (CuS) and lower valent copper sulfide. Preferably the cathodes contain a minimum of electrolytically inactive material, such as free copper. Most preferably, the cathodes consist essentially of cupric sulfide with a minimum of lower valent copper sulfide. Cupric sulfide accepts two electrons per atom of copper during cell discharge while lower valent copper sulfide accepts less electrons per atom of copper. Thus for a given weight of active cathode material cupric sulfide affords more electrochemical activity than does lower valent copper sulfide. The cathodes suitable for use in cells of this invention should contain at least 75% CuS, preferably at least 90% CuS and a minimum of free sulfur and free copper. The presence in such cathodes of cupric sulfide and lower valent copper sulfide and the substantial absence of free copper is demonstrated by means of X-ray diffraction analysis. Chemical analysis, e.g., for total copper, free sulfur (by $CS_2$ extraction) and total sulfur, is utilized to determine the ratio of cupric sulfide to lower valent cupric sulfide. The cathodes used in the cells of this invention are visibly porous, sufficiently mechanically strong, i.e., have sufficient structural integrity to remain intact during handling, cell storage and handling and cell discharge. The open-cell structure of the cathodes is clearly visible under magnification. Such cathodes have porosities of 40% to about 80%; i.e., 40% to about 80% of the cathode structure is void space. Cathodes with more than 50% porosity are preferred because less porous cathodes cannot sustain high drain rates due to hindered mass transport within the cathode, reducing the electrochemical utilization of copper sulfide. Cathodes of 40% to 50% porosity, while having lower drain rates and somewhat reduced utilization of cathode active material are nevertheless suitable for use where their high volumetric energy density and somewhat longer time of use are advantageous. Above about 80% porosity the cathode structure can become too fragile to remain intact during handling or discharge of a cell. Porosity is defined by and calculated with the following equation $$\text{Porosity \%} = (1 - [d_1/d_2] \times 100)$$

where $d_1$ is the apparent density of the cathode structure as determined from its volume and weight and $d_2$ is the density of cupric sulfide. The volumes of such cathodes are readily determined by known techniques.

Low resistivity of a cathode structure reflects high coherency and therefore it is suprising that the highly porous structures of this invention also are highly integral or coherent as shown by their low resistivities.

The cathodes of this invention have resistivities of less than 0.5 Ohm-cm. and preferably less than 0.2 Ohm-cm. To assure reproducible measurements, cathodes in the form of flat plates or disks of known surface area and thickness are employed for resistivity determinations. The voltage drop across the cathode is determined at a constant current of 500 milliamperes. Resistivity in Ohm-cm. is defined by the formula $$\text{ohm-cm} = (\Delta V/I) \times (A/t)$$

where $\Delta V$ is the voltage drop across the cathode in millivolts, $I$ is 500 milliamperes, $A$ is the cathode flat surface area in cm.$^2$ and $t$ is cathode thickness in cm., usually from about 0.05 to about 0.4 cm. Since cathode resistivity tends to vary with the contact pressure, the polished nickel contact plate pressure for the measurement should be 53 kg. per cm.$^2$ This pressure provides adequate plate-cathode-plate contact without deforming the porous cathodes.

The cathodes of the invention have relatively high porosity and a high proportion (approximately 75%) of the pores are large pores (cylinder diameters of greater than 4 $\mu$). The inherently high porosity of the cathodes of cells of this invention exposes the interior of the cathode for the desired electrochemical reactions. Large pores facilitate the necessary mass transfer within the cathode. Large pores and high porosity operate together to afford a high volumetric reaction rate and, therefore, cells with desirably high power drain rates.

The shapes and dimensions of the cathodes can vary widely according to requirements for operable disposition of the cathodes in voltaic cells. They can be disks, plates or rods of practical shape. The cathodes can be free-standing structures clamped into electrical contact with an external cell circuit, the cathode structure with its very low resistivity serving largely as its own current collector. They may be particulate, or an aggregate of particles, each particle having the resistivity, porosity and pore sizes as defined above, the aggregate operably held in intimate contact with a current collector in a cell. Often the cathodes are prepared in intimate physical and electrical contact with a conductor. Such conductors are current collectors providing contact between the cathode and an external cell circuit. Conductors can have a wide variety of forms such as rods, plates or meshes of conductive carbon or a metal which is inert to the cell components and to the sulfur and copper from which the cathodes are fabricated. In addition to being excellent current collectors, metal meshes serve to strengthen the cathode structure, especially cathode structures having relatively large areas. Useful metal meshes are, for example, of nickel, nickel plated steel, stainless steel, gold, platinum and like inert metals. Nickel and stainless steel meshes are preferred because of their high strength and ready availability.

To minimize useless cathode weight, a sulfur-to-copper atom ratio of 1.1:1 to 1:1 is preferably employed. The particle size of the particulate sulfur and copper used in the process for cathode preparation is not critical. It is preferable for easy and complete mixing to employ sulfur and copper particles of about the same size. Although suitable cathodes can be prepared from copper powder with particle sizes up to 200 $\mu$ or even larger, it is preferred to utilize copper and sulfur powders with particles no larger than about 50 $\mu$. Such small particles with their relatively larger surface area assure easy and complete mixing, a high degree of sulfur-copper contact and rapid sulfur-copper reaction completion during the heating step of the process. For these same reasons, a highly preferred form of copper powder is relatively porous, high-surface electrolytic copper dust having a maximum particle size of about 50 $\mu$. The particulate sulfur can be amorphous sulfur, crystalline sulfur or mixtures of the two. Crystalline or sublimed sulfur powders are preferred because of their high reactivity with copper and ready availability.

Pressure molding the sulfur-copper mixture into a coherent body at below the melting point of sulfur avoids compacting and reduction of the porosity of the finished cathode. Pressing the mixture at room temperature is preferred because it assures that no adverse compacting occurs and does not require means for press heating. Such pressure molding may be accomplished by any suitable means, for example, by means of a powder press. The pressure applied and the period of pressure application are, at least, somewhat dependent on the press being employed, the composition of and the particle sizes in the sulfur-copper mixture and on the desired dimensions of the coherent body, which dimensions will be substantially those of the finished cathode. It has been found, for example, that a pressure of from about 100 to about 700 kg. per cm.$^2$ gauge, applied for a few seconds to several minutes, is quite adequate to prepare flat, coherent disks or plates 0.05 to 0.4 cm. thick from a 1:1 atom ratio mixture of sublimed sulfur and electrolytic copper powders with maximum particle sizes of about 50 $\mu$. Higher pressures, up to 1500 kg. per cm.$^2$ gauge are employed to produce disks or plates of slightly greater density and lower porosity.

Heating or curing the coherent body to complete fusion and the sulfur-copper reaction can be accomplished by a wide variety of means. What is required is that either the whole body or a portion thereof be heated sufficiently to initiate the reaction between the copper and the sulfur and that the reaction conditions be maintained until the reaction is complete, that is until the available sulfur and copper are utilized. Quantitative determination of maximum sulfur and copper utilization can be provided by X-ray diffraction and/or chemical analysis. Reaction is complete, for example, in a minute or less when flat, coherent disks or plates 0.05 cm. to 0.4 cm. thick, molded from a 1:1 atom ratio mixture of 50 $\mu$ sublimed sulfur and electrolytic copper powders, are placed between metal plates preheated to 350°C. Reaction is also substantially completed in less than 5 minutes when such disks or plates are heated to 120°C. between the plates. Below about 120°C. reaction completion is impractically slow. Reaction can be initiated in the coherent body by heating a portion of the body by means of a flame or a hot wire. Under adiabatic conditions a self-sustaining, exothermic reaction then runs to completion without additional heating of the body. The preferred temperature range is from about 120°C. to about 350°C.

Preparing a cathode suitable for use in the cells of this invention in intimate electrical contact with a conductor or current collector is easily accomplished by molding the coherent cathode body into contact with the conductor during the pressing step of the process.

It has been found that aging the mixture of sulfur and copper powders or the pressed coherent body thereof to convert at least 25% of the sulfur to copper sulfide markedly reduces the amount of the electrochemically less desirable low valent copper sulfide and increases the amount of the preferred cupric sulfide in the finished cathode. Aging also markedly reduces the weight loss which can occur during the heating step of the process due to loss of free sulfur in the finished cathode. Uncombined sulfur in a finished cathode is unnecessary and may tend to shorten the shelf-life of cells which contain electrolytes which dissolve sulfur and wherein the sulfur can attack the active anode metal. Aging is a very simply conducted process requiring only that the mixture or the pressed coherent body be stored at a temperature from about 20°C. to below the melting point of sulfur and preferably at 20° to 60°C. and most preferably at 50°C. in normal air for the desired period. The beneficial effects of such aging are apparent with sulfur-copper mixtures where the copper particles are either larger than 50 $\mu$ or where the copper particles are of low porosity. However, these effects are most pronounced with the highly preferred 50 $\mu$ sublimed or crystalline sulfur and electrolytic copper powders. With such preferred mixtures or with the coherent bodies molded therefrom, aging at 25° to 30°C. for 20 to 30 hours reduces the low valent copper sulfide content of the finished cathode to 25% by weight or less and reduces the curing weight loss and free sulfur significantly. The low valent copper sulfide content of finished cathodes, free sulfur and curing weight loss are still further reduced by longer aging. With the preferred sulfur-copper mixtures the low valent copper sulfide content in finished cathodes can be reduced to less than 5 to 10 weight % by aging for 200 to 300 hours at about 25°C. Structures prepared by the above process can be cut or milled into other than their original shapes.

It will, of course, be apparent that the rate of reaction of copper and sulfur powders will be dependent on both the state of division of the powders and the temperature at which the reaction is conducted. The reaction is exothermic and care should be exercised to prevent runaway of the reaction to a temperature above the melting point of sulfur.

Voltaic cells of this invention broadly include aqueous electrolyte cells, for example, a cell consisting essentially of a zinc anode, an aqueous caustic electrolyte and a cathode as described above. However, the invention is particularly directed to high energy density cells having anodes of highly electropositive, light metals such as lithium, sodium, potassium, beryllium, magnesium and calcium, a non-aqueous solvent-electrolyte system, which is inert, i.e., non-reactive towards such metals and other cell components, having a conductivity of at least $10^{-3}$ ohm$^{-1}$ cm$^{-1}$, and a copper sulfide cathode as described above. Lithium is the preferred anode metal because it is the least dense and the most electropositive of all the metals. Except that cells be operable, this invention does not concern cell design. Requirements for operability are that a cathode of this invention and an anode of such light metal be spaced apart, in mutual contact with an inert, preferably non-aqueous solvent-electrolyte system and that the electrodes be electrically connected to an external circuit wherein electrical energy from the cell can be utilized. It will be appreciated that it is highly desirable to isolate (seal) the reactive light metals in such cells from airborne moisture or gases which react with and needlessly destroy such metals. Suitable cells can have many forms. One such gas-tight cell designed for circular, flat disk cathodes, comprises two nickel plates which are bolted together against an annular, gasketed, nonconductive, inert spacer. The cathode plate has a recess machined to fit tightly the cathode disk, the recess being concentric with and smaller in diameter than the spacer ring. The matching anode plate is similarly recessed to accept a disk of the anode metal. Sealable openings in either or both plates, entering the cell between the recesses and the spacer seat, provide for filling the cell with electrolyte solution. The two plates provide external electrical contacts for the anode and the cathode. The cell is assembled in a dry argon atmosphere by inserting the cathode disk into its recess, filling the anode recess with the anode metal, placing a disk of non-woven, compressible, ceramic fiber, slightly thicker than the final desired cathode-to-anode spacing, inside the spacer ring and bolting the two plates together, electrodes inward, against the spacer. The cell is activated by filling the space inside the spacer ring with an electrolyte solution. After sealing the openings the cell is removed from the argon atmosphere and operably connected to an external circuit which measures cell performance.

Electrolytes for such cells include, for example, solutions of such salts as, perchlorates of lithium, sodium and potassium, hexafluorophosphates of these metals, tetrafluoroborates of these metals and tetrachloroaluminates of these metals. Solvents for such salts include, for example, polyethers, e.g., 1,2-dimethoxyethane, the dimethyl ether of diethyleneglycol, tetrahydrofuran, mixtures of such ethers, methyl acetate, ethyl acetate, propylene carbonate, butyrolactone and dimethylformamide. Particularly preferred for lithium anode cells having a cathode of this invention is an electrolyte consisting essentially of a 20 weight % solution of lithium perchlorate in methyl acetate. This electrolyte permits a high utilization of cathode active copper sulfides.

The following examples illustrate the easy preparation, the novel characteristics and superior performance of the cells of this invention. All cathodes, except some of those of the comparative examples, had resistivities less than 0.5 ohms-cm.

EXAMPLE I

A mixture having a 1:1 atom ratio of sulfur-to-copper was prepared from sublimed sulfur powder, maximum particle size 50 $\mu$, and electrolytic copper dust, maximum particle size 50 $\mu$. The mixture was aged at about 25°C. for 25 hours. A 1.90 g. portion of the aged mixture was evenly distributed on the base plate of a powder press designed to prepare flat disks having a single face area of 6.50 cm.$^2$ A pressure of 350 kg. per cm.$^2$ gauge was applied to the mixture to produce a coherent disk. The raw disk was cured by heating it for 1 minute between asbestos faced aluminum plates, previously heated to and maintained at 350°C. The resulting cathode was dark blue in color, rigid and visibly porous. Its open cell structure was easily seen with the aid of a microscope. The cathode had a porosity of 57%. The resistivity of the cathode was less than 0.1 Ohm-cm. X-ray diffraction analysis indicated that there was no free copper, copper oxide or cuprous sulfide in the cathode and that it contained both CuS and digenite, $Cu_9S_5$, the latter present in minor proportion. Quantitative analyses for copper and sulfur indicated that the cathode contained 77.2% CuS and 21.8% digenite and 0.25% free sulfur.

Pressures as low as 105 kg. per cm.$^2$ were found to produce satisfactory, coherent raw disks at 20° to 30°C. from the preferred 1:1 atom ratio sulfur-copper mixture. Coherent raw disks which cured into completely satisfactory cathodes were also prepared at 500 to 700 kg. per cm.$^2$ Cathodes having the same low resistivity and at least 50% void space were prepared by curing raw disks at 120°C. for 2 to 5 minutes.

Nickel metal mesh was incorporated into other cathodes by placing a flat disk of the mesh on the base plate of the powder press before distribution of the sulfur-copper mixture.

Cathodes were also prepared similarly from mixtures of sublimed sulfur and spherical copper particles having a maximum diameter up to about 100 $\mu$.

The following examples illustrate the considerable advantages of aging the sulfur-copper mixture before the preparation of the finished cathode.

EXAMPLES II–V

Cathodes were prepared as in Example I except that the 1:1 atom ratio sulfur-copper powder mixture was aged at about 25°C. for different periods before being pressed and cured. As is shown in Table I, such aging reduces the amount of the electrochemically less desirable digenite and free sulfur in the cathodes. Such aging also sharply reduces weight loss during the curing.

TABLE I

| Ex. | Aging Time, hours | Free sulfur in finished cathode, wt.% | Low valent copper sulfide in finished cathode, wt.% | Cupric sulfide in finished cathode, wt.% | Weight loss during curing, wt.% |
|---|---|---|---|---|---|
| II | 1.5 | 0.8 | 87 | 13 | 13.2 |
| III | 7.4 | 0.4 | 62 | 37 | 10.1 |
| IV | 72.9 | 0.1 | 14 | 85 | 4.2 |
| V | 240 | <0.1 | 4 | 95 | 3.1 |

The following examples demonstrate both the high porosity and the high percentage of large pores in the cathodes suitable for use in the cells of this invention.

EXAMPLES VI–VIII

Cathodes were prepared as in Example I with Example I sulfur-copper powder mixtures aged 23, 163 and 308 hours. Mercury porosimetry measurements indicated that the bulk of the pores in the cathodes had pore sizes, calculated as cylinder diameters, greater than 4 $\mu$. Table II summarizes the data.

TABLE II

| Ex. | Powder mixture aged, hours | Finished cathodes Porosity % | Pores > 4$\mu$, % |
|---|---|---|---|
| VI | 23 | 59 | 85 |
| VII | 163 | 57 | 78 |
| VIII | 308 | 62 | 84 |

The beneficial effect of aging the sulfur-copper before curing does not adversely affect either porosity or pore size.

Example IX demonstrates the preparation of a cathode suitable for use in the cells of this invention and Examples X and XI demonstrate two copper sulfide cathodes prepared by methods well-known in the art and not suitable for use in cells of this invention. Table III, following the examples, compares the properties of the three cathodes.

EXAMPLE IX

A cathode was prepared as in Example I from a 1.90 g. portion of the sulfur-copper mixture aged 365 hours at about 25°C.

EXAMPLE X

A cathode was prepared in two steps by the method of French Pat. No. 1,490,725 using the powder press of Example I and 1.90 g. of the Example I sulfur-copper mixture aged 175 hours at about 25°C. The mixture was pressed for 10 hours at 250 to 380 kg. per cm.$^2$ gauge and at 156°C. The pressure was released and the resulting structure cooled and then heated to and maintained at 121°C. for an additional 6.5 hours at atmospheric pressure. The finished cathode was dark blue, rigid and visibly less porous than the cathode of Example IX.

EXAMPLE XI

A cathode was prepared in the powder press of Example I by pressing 1.65 g. of reagent grade cupric sulfide powder for 4 minutes at 2800 kg. per cm.$^2$ and at 25°C.

TABLE III

| Cathode from Example | Resistivity at 53 kg/cm$^2$ contact pressure, ohm-cm | Porosity % | Pore size greater than 4 $\mu$, % |
|---|---|---|---|
| IX | 0.040 | 61 | 84 |
| X | 0.074 | 38 | 47 |
| XI | 1.48 | 35 | 55 |

The data in Table III clearly demonstrate the superior properties of the cathode of Example IX over the others. The comparative cathodes do not even approach the cathode of Example IX in porosity or in percentage of large pores. The Example X cathode which has the lower resistivity of the two art cathodes is still 85% higher in resistivity than the cathode of Example IX.

EXAMPLE XII

A cathode was prepared as in Example I, except that the sulfur-copper mixture had been aged 21 hours at 25°C. and the cathode was prepared in contact with a nickel metal mesh disk of the same diameter as the cathode. After curing, the cathode weighed 1.90 g. exclusive of the mesh. It theoretically had 1.05 ampere-hours of electrochemical capacity calculated as CuS. The cathode was tightly fitted, mesh-side-to-nickel, into a cylindrical machined recess in a nickel plate. In a dry argon atmosphere, the recess in a comparable plate was filled with 0.3 g. (1.18 ampere-hours) of lithium metal. A gas-tight cell was prepared in the argon atmosphere by bolting the two plates together with nylon bolts against an 0.5 mm. thick, circular pad of non-woven ceramic fiber held inside a polytetrafluoroethylene spacer ring of somewhat larger diameter than the cathode and anode recesses. A tight seal between the edges of the spacer and the nickel plates was assured by using synthetic chlorinated rubber gaskets. There resulted a cell with anode and cathode faces spaced 0.4 mm. apart. The cell was evacuated to 0.1 mm. Hg absolute pressure and allowed to fill, until the pressure was at atmospheric pressure, with an electrolyte solution consisting essentially of 10 weight % lithium perchlorate dissolved in a 70:30 volume ratio mixture of tetrahydrofuran and 1,2-dimethoxyethane. After sealing the openings in the plates used to evacuate and to fill the cell, the cell was discharged at a constant current of 11 milliamperes. The cell, discharged to an arbitrary cut-off voltage of 1.0 volt in 62 hours, produced 0.655 ampere-hour; i.e., 65% of the cathode material taken as CuS was utilized in producing energy. The average discharge voltage was 1.42 volts.

EXAMPLE XIII

A cathode was prepared substantially as in Comparative Example X except that the sulfur-copper mixture had been aged for 121 hours and that the cathode was prepared in contact with a nickel metal mesh. When the cathode was discharged to 1.0 volt as in Example V, the discharge lasted 40 hours, at an average voltage of 1.50 volts and only 42% of the cathode material, calculated as CuS, was utilized.

Disk cathodes, performing substantially as in Example XII, can be prepared without the metal mesh.

Example XIV

A cell was prepared as in Example XII with the substitution of an electrolyte of 20 weight percent lithium perchlorate dissolved in methyl acetate for the electrolyte of Example XII. The cell was then discharged in the manner described in Example XII, and 78% of the cupric sulfide of the cathode, calculated as CuS was utilized.

EXAMPLE XV

Cupric sulfide cathodes were prepared as in Example I but using Belmont No. 250 copper flake obtainable from Belmont Smelting and Refining Works, Inc., 330 Belmont Ave., Brooklyn, N.Y. 11207. The copper sulfur mixture was aged as described in Example I. Copper sulfide discs were pressed at room temperature for 5 seconds at 350 kg. per cm.$^2$ and 1400 kg. per cm.$^2$ for comparison. After pressing, the cathode discs were cured for 4 minutes between asbestos faced aluminum plates held at 225°C.

Two of the 350 kg. per cm.$^2$ discs and two of the 1400 kg. per cm.$^2$ discs were installed in cells and tested as described in Example XII. The cells were discharged through a constant resistance of 173 ohms to a cut off voltage of 1.0 volt. Data are shown in Table IV below.

TABLE IV

| | Cathode | | Electricity | Discharge Time | CuS Utilized | Average Discharge Voltage | Watt Hours per | | Watts per | |
|---|---|---|---|---|---|---|---|---|---|---|
| | Pressing | Porosity | (ma/cm$^2$) | (Hrs) | (%) | (volts) | pound Li+CuS | cubic in. | pound Li+CuS | cubic in. |
| a) | 350 kg per cm$^2$ | 55% | 1.47 | 48 | 86 | 1.65 | 308 | 13.7 | 6.4 | 0.29 |
| b) | 350 kg per cm$^2$ | 54% | 1.43 | 50 | 90 | 1.61 | 313 | 13.8 | 66.3 | 0.28 |
| c) | 1400 kg per cm$^2$ | 42% | 1.31 | 52 | 84 | 1.48 | 269 | 13.4 | 5.2 | 0.26 |
| d) | 1400 kg per cm$^2$ | 41% | 1.20 | 53 | 77 | 1.34 | 224 | 11.3 | 4.2 | 0.21 |

As can be seen, the 41–42% porosity cathodes discharged over a slightly longer interval than those with 54–55% porosity. Also the volumetric energy density of the lower porosity cathodes compares favorably with that of the higher porosity cathodes. For some applications the higher density, reduced porosity cathodes are more desirable than those of higher porosity, especially where capacity is the overriding concern.

What is claimed is:

1. In a voltaic cell comprising an anode selected from the group of lithium, sodium, potassium, beryllium, magnesium and calcium, a copper sulfide cathode and an electrolyte which is non-reactive toward other cell components and has a conductivity of at least 10$^{-3}$ ohm$^{-1}$ cm$^{-1}$ the improvement comprising a porous cathode structure consisting essentially of fused copper sulfide and having a porosity of at least 40% and a resistivity of less than 0.5 ohm-cm.

2. The voltaic cell of claim 1 in which the fused copper sulfide cathode contains at least 75 weight percent cupric sulfide, has a porosity from about 50% to about 80% and has a resistivity of less than 0.2 ohm-cm.

3. The voltaic cell of claim 2 in which the cathode is in electrical contact with a conductive current collector.

* * * * *